Sept. 11, 1956     P. J. MAJOR     2,762,199
SAFETY HYDRAULIC BRAKE SYSTEM
Filed Oct. 29, 1954

INVENTOR.
PHILIPPE J. MAJOR
BY Fulwider, Mattingly
and Huntley
ATTORNEYS.

United States Patent Office 2,762,199
Patented Sept. 11, 1956

2,762,199
SAFETY HYDRAULIC BRAKE SYSTEM

Philippe J. Major, Gardena, Calif.

Application October 29, 1954, Serial No. 465,710

1 Claim. (Cl. 60—54.6)

The present invention relates generally to automative vehicles and more particularly to an improved hydraulic brake system for use therewith.

The conventional hydraulic brake system presently utilized on automotive vehicles includes a single master cylinder that is connected by hydraulic conduits to individual braking units mounted by each of the four wheels of a vehicle. Should a break occur in any one of the hydraulic conduits or its individual wheel braking unit the entire hydraulic system will be immediately rendered inoperative, due to the loss of pressure in the master cylinder. Accordingly, the driver will no longer be able to stop the vehicle by means of the hydraulic brake system and an extremely dangerous situation is thereby created.

It is a major object of the present invention to provide a new and improved hydraulic brake system for use with automotive vehicles.

Another object of the invention is to provide a hydraulic brake system wherein should a break occur in one of the hydraulic conduits connecting the master cylinder member to one of the four individual wheel braking units, the remaining individual wheel braking units will continue to function so as to enable the driver to bring the vehicle to a safe stop.

A further object is to provide a hydraulic brake system of the aforedescribed nature that is simple of design having but few working parts and that is rugged of construction whereby it may afford a long and trouble-free service life.

Yet another object of the invention is to provide a hydraulic brake system of the aforedescribed nature which may be manufactured at a price that is comparable to that of existing hydraulic brake systems.

An additional object is to provide a hydraulic brake system of the aforedescribed nature that may either be installed on an automotive vehicle as original equipment or may replace existing braking equipment.

These and other objects and advantages of the present invention will become more apparent from the following detailed description of a preferred embodiment thereof, when taken in conjunction with the appended drawings wherein.

Figure 1:
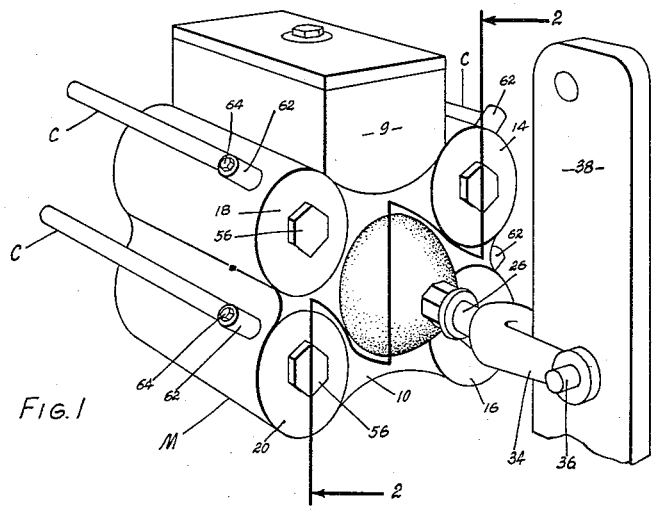
Figure 1 is a perspective view of the major portion of a hydraulic brake system embodying the present invention.

Referring to the drawings, the preferred form of safety hydraulic brake system embodying the present invention is adapted to be utilized in conjunction with four hydraulic conduits C leading to the four individual wheel braking units (not shown) mounted by the wheels of an automotive vehicle. These four hydraulic conduits C and their respective wheel braking units may be identical to those now in use with conventional hydraulic brake systems. The preferred form of hydraulic brake system includes a master cylinder member, generally designated M, which is operatively connected to the brake pedal (not shown) of the automotive vehicle whereon it is installed. The master cylinder member M is adapted to replace the conventional master cylinder now installed on automotive vehicles.

More particularly, the body 10 of the master cylinder M will preferably be formed of a single casting and it includes a brake fluid reservoir 9 located over a centrally disposed cylindrical main chamber 12 that is encompassed by four parallel cylindrical auxiliary chambers 14, 16, 18 and 20. A main piston 22 is axially slidably disposed within the main chamber 12 for axial reciprocation therein. The front portion of the main piston 22 is coaxially formed with a conical cavity 24 that receives the rear end of a push rod 26. The latter extends through a coaxial bore 28 formed in a retainer 30 rigidly mounted at the front end of the main chamber 12 by a snap ring 31. The retainer limits the extent of forward movement of the push rod 26. Forwardly of this retainer 30 the push rod 26 is secured to a flexible rubber-like seal 32 which encompasses the periphery of the front end of the main chamber. The front end of the push rod 26 is formed with a clevis 34 which is pivotally attached by a pin 36 to the intermediate portion of a lever 38. The upper end of the lever 38 is pivotally attached to the frame (not shown) of the automotive vehicle and is operatively connected to the brake pedal (not shown) of said vehicle. A helical compression spring 40 is interposed between the rear of the main piston 22 and the rear closure 42 of the main chamber 12. A bleed plug 43 may be carried by said rear closure.

Each of the auxiliary chambers 14, 16, 18 and 20 axially slidably carry identical auxiliary pistons designated 44. The front and rear ends of these chambers are sealed by plugs 46 and 48, respectively. The latter each centrally mount stop elements 50 which project into the front and rear portions of the auxiliary chambers. Preferably, the plugs 46 and 48 will include an annular disk 49 having external threads 52 for engaging complementary internal threads 54 internally formed at the front and rear ends of the auxiliary chambers. Headed elements 56 integrally formed and centrally disposed on the outside of each plug may be utilized for effecting rotation of the plugs relative to the auxiliary chambers.

A helical compression spring 58 is interposed between the front of each of the auxiliary pistons 44 and the rear surface of each of the front plugs 46. It should be noted that in Figure 3, this spring is not shown in auxiliary chamber 14 in the interest of clarity. Each auxiliary chamber 14, 16, 18 and 20 is in direct hydraulic communication with the rear portion of the main chamber 12 by means of ports 60 formed in the walls 61 separating the main chamber from each of the auxiliary chambers. The front portion of each of the auxiliary chambers is formed with a suitable fitting 62 that is connected to one of the hydraulic conduits C leading to the individual wheel braking units. A plug 64 is threaded into the outer end of each of these fittings 62 for the purpose of bleeding the system.

Figure 2:
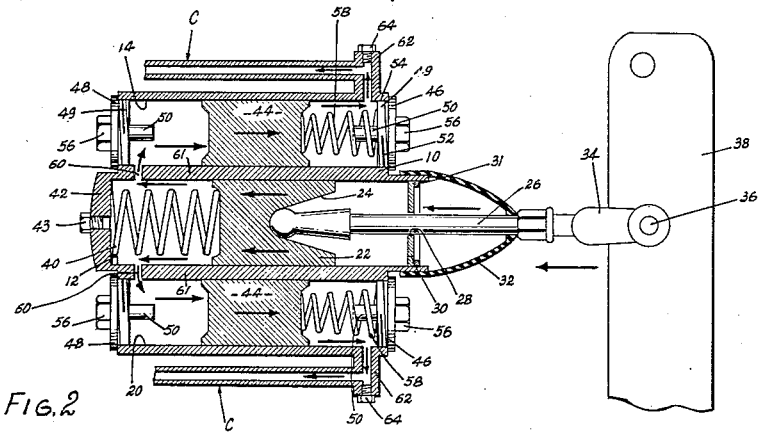
Figure 2 is a sectional view taken along lines 2—2 of Figure 1.

Referring now to Figure 2, during a braking operation of the safety hydraulic brake system embodying the present invention, the lever 38 is pivoted rearwardly under the influence of the brake pedal of the automotive vehicle. Such motion of this lever is in turn concurrently transferred to the main piston 22 by means of the push rod 26. The hydraulic fluid contained in the rear portion of the main chamber 12 is thus forced outwardly through the ports 60 into the rear portion of the auxiliary chambers 14, 16, 18 and 20. This effects concurrent forward movement of the auxiliary pistons 44 within their respective auxiliary chambers. The hydraulic fluid disposed forwardly of the auxiliary pistons is thus forced out of the front portion of the auxiliary chambers through the hydraulic conduits C into the four individual braking units of the automotive vehicle so as to effect the actuation thereof.

Figure 3:
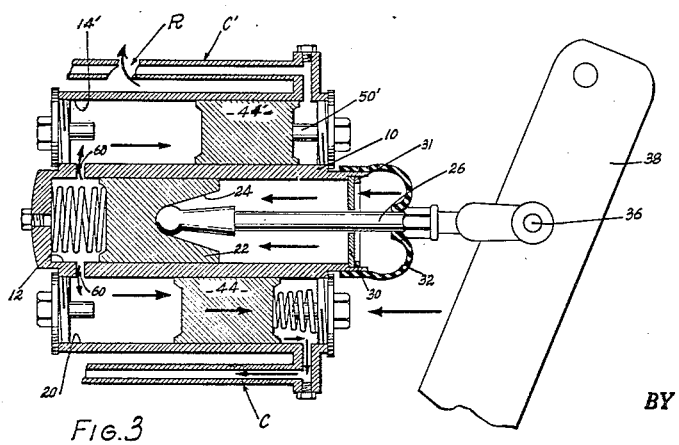
Figure 3 is a perspective view similar to Figure 2 but showing the parts disposed in different positions.

Referring now to Figure 3, should a rupture or break occur in any of the hydraulic conduits such as that designated C', as represented at R in this figure, the pressure of the hydraulic fluid disposed forwardly of the auxiliary piston 44' in the auxiliary chamber 14' would immediately drop to zero. Hence this piston would be moved against the stop element 50'. The auxiliary piston 44 would, however, seal off the hydraulic fluid disposed rearwardly thereof from loss and the hydraulic fluid remaining in the main chamber 12 would hence be retained. Accordingly, even though the main piston 22 would be required to move a greater distance rearwardly than under normal conditions (because of the loss of volume of the hydraulic fluid) the auxiliary chambers 16, 18 or 20 would remain pressurized and the automotive vehicle could be safely halted by the remaining functioning wheel braking units. The same results would be effected should a leak develop in more than one of the hydraulic conduits C and the automotive vehicle may be brought to a stop even though three of the four conduits C (or their individual wheel braking units) are damaged.

While there has been shown and described hereinabove what is presently considered to be a preferred embodiment of the present invention it will be apparent that various modifications and changes may be made thereto without departing from the spirit of the invention or the scope of the following claim.

I claim:

A safety hydraulic brake system for use with an automotive vehicle that includes a plurality of individual wheel braking units and hydraulic conduits connected thereto, comprising: a body; a fluid reservoir formed in the upper portion of said body; a cylindrical main chamber centrally formed in said body below said reservoir; a plurality of cylindrical auxiliary chambers encompassing said main chamber and parallel thereto formed in said body, each end of said auxiliary chambers being open and formed with internal threads; a plug for each end of said auxiliary chambers, said plugs each having an annular externally threaded disk engageable with said internal threads, a stop element that extends into its respective auxiliary chamber and a headed element centrally formed on the outside of said annular disk; a threaded fitting hydraulically connecting the front end of each of said auxiliary chambers with one of said hydraulic conduits; a bleed plug in each of said fittings; ports hydraulically connecting the rear end of each of said auxiliary chambers with the rear end of said main chamber; a main piston axially slidably disposed in said main chamber; an auxiliary piston axially slidably disposed in each of said auxiliary chambers; an integral rear closure for said main chamber; a bleed plug in said rear closure; a coaxially bored retainer in the front portion of said main chamber; a snap ring holding said retainer in place; a push rod slidably carried by said coaxially bored retainer and connected at its rear end to said main piston; a rubber-like seal affixed to said push rod and secured over the front end of said main chamber; a helical compression spring constantly biasing said main piston forwardly; a helical compression spring constantly biasing each of said auxiliary pistons rearwardly; and, means operatively connecting the front end of said push rod to the brake pedal of said vehicle.

References Cited in the file of this patent
UNITED STATES PATENTS

| | | |
|---|---|---|
| 1,952,557 | Masteller | Mar. 27, 1934 |
| 1,955,180 | Furgason | Apr. 17, 1934 |
| 2,056,940 | Francis et al. | Oct. 13, 1936 |
| 2,067,697 | Fontaine | Jan. 12, 1937 |
| 2,077,646 | Snyder | Apr. 20, 1937 |
| 2,111,930 | Hinckley | Mar. 22, 1938 |
| 2,529,306 | Morris | Nov. 7, 1950 |
| 2,583,825 | Felt | Jan. 29, 1952 |